United States Patent Office 3,332,081
Patented July 18, 1967

3,332,081
APPARATUS FOR COMPARING THE AMPLITUDES OF MODULATION OF TWO MODULATION SIGNALS OF DIFFERENT FREQUENCY
Gerald Keith Lunn and Edward James Grisley, both of Chessington, England, assignors to The Wayne Kerr Company Limited, Chessington, England, a company of Great Britain
Filed Mar. 10, 1966, Ser. No. 533,212
Claims priority, application Great Britain, Apr. 13, 1965, 15,798/65
11 Claims. (Cl. 343—108)

ABSTRACT OF THE DISCLOSURE

In an airborne or ground monitor or control receiver for an I.L.S. system of the kind disclosed in U.S. Patent No. 3,302,202, a phase sensitive detector is used to detect a 30 c./s. component in the output of a balanced modulator to which are applied the 90 c./s. and 150 c./s. input signals and a reference signal of 120 c./s. derived from the input signals. The output of the detector represents the deviation from the equi-signal course line or glide path. The present specification describes an arrangement for obtaining an off-set course line or glide path by feeding a further 30 c./s. signal of adjustable amplitude and appropriate phase into said detector.

---

Figure 1:
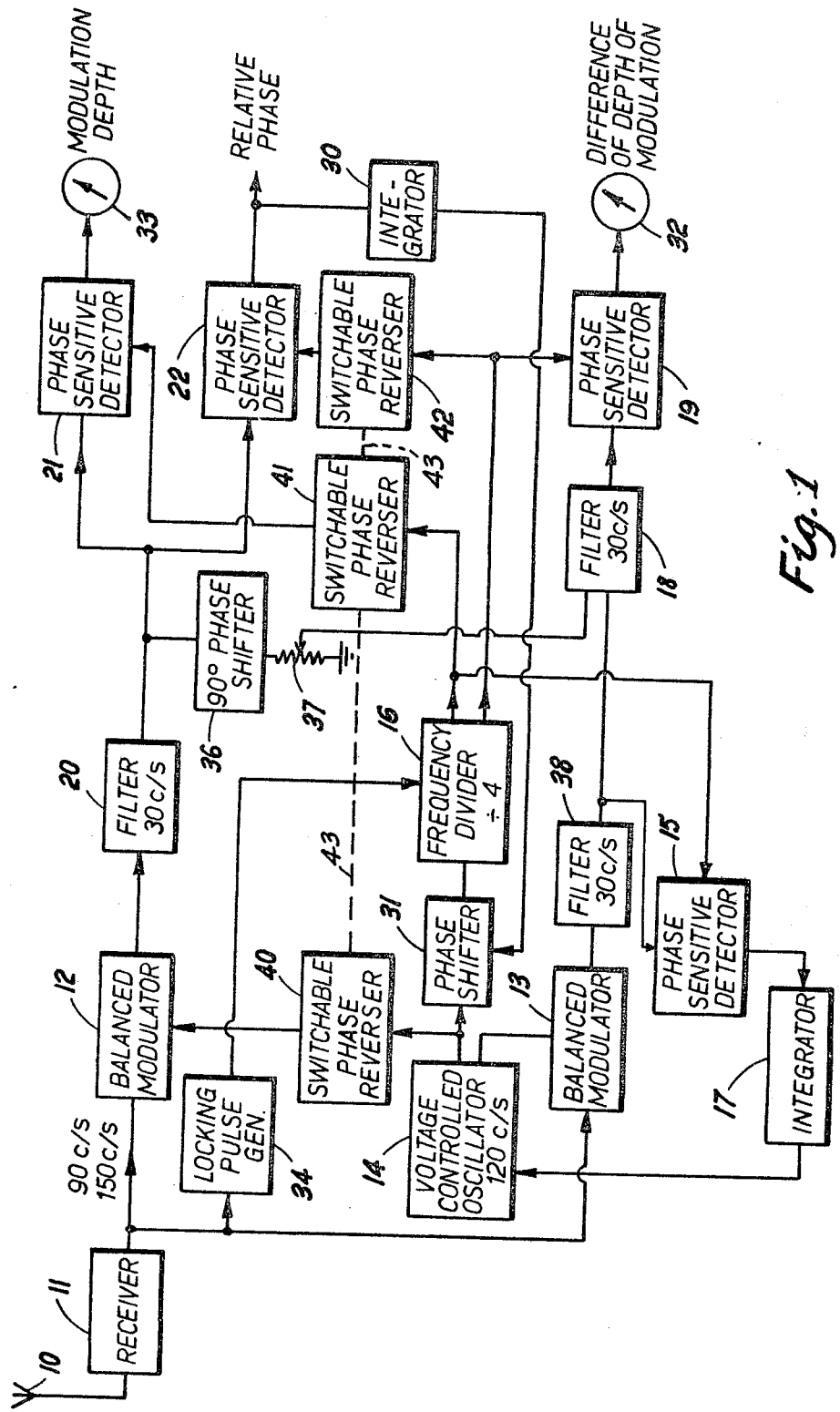

The invention relates to apparatus for comparing the amplitudes of two signals of different frequency and particularly for comparing the amplitudes of modulation of two modulation signals of different frequency on a single carrier.

In United States patent specification No. 3,302,202 there is described and claimed apparatus for comparing the amplitudes of two input signals of different frequencies comprising a signal source providing a reference signal of a frequency exactly midway between that of the two input signals, means for adjusting the phase of the reference signal (i.e. the mean frequency signal), a balanced modulator for amplitude-modulating the phase-adjusted mean frequency signal with the combined input signals and a detector, preferably a phase sensitive detector, for detecting the amplitude of the output signal from the balanced modulator at a frequency equal to half the difference between the frequencies of the two input signals. As is explained in the aforementioned specification, the mean frequency reference signal may readily be obtained from the two input signals. The expression "balanced modulator" is used to mean any device which acts as a multiplier of two electrical signals; that is to say a device giving an output the instantaneous amplitude of which is equal to the product of the instantaneous amplitudes of the input. The detector of the above described apparatus provides an output signal at half the difference frequency which, provided the phase adjusting means is correctly set, is representative of the difference of amplitude of the two inputs and is zero when these two inputs are equal.

This apparatus has particular application in the aircraft landing system known as I.L.S. (Instrument Landing System) in which guidance in the azimuth plane for the approach of an aircraft to a runway for landing is given by means of two directional radio beams having the same carrier frequency, one being modulated at a frequency of 90 c./s. and the other at frequency of 150 c./s. These two beams partially overlap to give an equi-signal path indicating the line of approach to the runway and for this reason these two beams are referred to as the "localizer." In the I.L.S. system, glide path indication is also given in a somewhat similar manner using two beams on another carrier frequency which beams are modulated respectively with the two modulation frequencies. As is explained in the aforementioned specification, the apparatus described therein enables the modulation amplitudes to be compared to a far higher degree of accuracy than is possible in systems, such as have been used heretofore, employing filters for separating the two modulation signals. The apparatus described above may be used not only on an aircraft to obtain guidance information which may be presented visually to the pilot or used in an automatic control system but it may also be used for monitoring the transmissions from the ground transmitters and/or for providing automatic control of the ground transmitters.

In the apparatus described in the aforementioned specification, the output of the detector is zero when the receiver is on the required equi-signal course line. For some purposes however it may be desired to fly an aircraft along a radial line defined by some predetermined difference of depths of modulation, that is to say a line making an angle with the normal equi-signal course line defined by the system. Likewise it may sometimes be convenient to set up a ground monitor station, not on the equi-signal course line where the depths of modulation of the two signals are equal, but at a position to one side of the required course line. The present invention is directed to providing a receiver system which may more conveniently be used for such an off-set course line.

According to this invention, in apparatus for comparing the amplitudes of two input signals of different frequencies comprising a signal source providing a reference signal of a frequency exactly mid-way between that of the two input signals, means for adjusting the phase of the reference signal, a balanced modulator for amplitude-modulating the phase-adjusted mean frequency signal with the combined input signals and a detector for detecting the amplitude of the output signal from the balanced modulator at a frequency equal to half the difference between the frequencies of the two input signals, means are provided for feeding a signal of adjustable amplitude and of a frequency equal to half the difference between the frequencies of the two input signals into said detector, said further signal being in phase with the component of the detector input representative of the difference of the amplitudes of the two input signals. In an I.L.S. system, the detector detects a 30 c./s. signal and preferably the feed from the balanced modulator to the detector incorporates a band-pass filter tuned to 30 c./s. The aforesaid further signal conveniently is fed into the input of this filter. This further signal of adjustable amplitude enables a zero output to be obtained from the detector (which is preferably a phase sensitive detector having a 30 c./s. reference signal) when the output would otherwise be at some value which is not zero. This is particularly convenient in an aircraft receiver if it is required to fly along an off-set course line corresponding to some predetermined difference of depth of modulation of the received signals since the adjustable signal fed into the detector may be adjusted to the amplitude corresponding to the required difference of depth of modulation and then the aircraft can be flown in the normal manner, for example using a conventional type of centre zero indicator, for I.L.S. equi-signal course line guidance.

The manner of deriving the aforesaid further signal of a frequency equal to half the difference between the frequencies of the two input signals will depend on the requirements as to how the off-set course line is to be defined. If this course line is to be defined in the conventional manner heretofore as corresponding to a predetermined difference of depths of modulation, the further signal conveniently is obtained from a stable direct voltage source which is modulated at the required frequency. This modulation may conveniently be effected by a chopper at the modulation frequency; the phase and frequency may be controlled using an appropriate signal at a frequency equal to half the difference between the frequencies of the two input signals, for example, the reference signal for the detector if a phase sensitive detector is employed. As is explained in the aforementioned Patent No. 3,302,202, in an I.L.S. system this signal is of 30 c./s. and may conveniently be obtained using a frequency divider dividing the frequency of the reference signal fed to said balanced modulator.

More generally however it may be required that the further signal fed into the detector has an amplitude which is a known fraction of the modulation depth of the signals received in an I.L.S. receiver. As is explained in the aforementioned patent specification No. 3,302,202, the modulation depth may be determined by using a further balanced modulator with a reference signal of the mean frequency but in phase quadrature with the reference signal fed to the first mentioned balanced modulator. This further balanced modulator will give an output signal of amplitude representative of the sum of the amplitudes of the two inputs and, since the depths of modulation of the two different radiated modulation frequencies are kept equal at the transmitter, this signal is of amplitude representing the mean depth of modulation. This output signal is of a frequency equal to half the difference frequency, that is to say 30 c./s. in the case of an I.L.S. system, but is in phase quadrature with the output from the first mentioned balanced modulator. Conveniently therefore a further balanced modulator is provided as described above and the output thereof is fed through a 90° phase shifter to a voltage divider, for example a potentiometer, enabling an adjustable fraction of this voltage to be fed into the first mentioned detector. By this construction the output of the first mentioned detector is made zero when the input signals have a difference of amplitude equal to a known fraction of the sum of their amplitudes as determined by the voltage divider. Thus in the case of an I.L.S. system, when the output of the detector is zero, the receiver is on some predetermined off-set course line defined in terms of the ratio of the difference of depths of modulation to the sum of the depths of modulation. This is therefore not dependent on the exactness of the control of the modulation depth at the transmitters. Furthermore this course line is not dependent on any changes in the receiver gain or of the working point of any automatic gain control system in the receiver.

This apparatus thus finds particular application in receivers for use in calibration aircraft which have to be flown along off-set course lines for checking the accuracy of the I.L.S. system. The invention also finds application in ground monitor equipment if it is required to locate the pickup aerial of the monitor equipment at a position not on the equi-signal course line but off-set to one side thereof. Here again the receiver will provide indication of deviations from the required difference of depth of modulation which are not dependent on the sum of the modulation depths of the two components.

In the above described receiver, the reference signal of the mean frequency is preferably controlled in phase automatically in the manner described and claimed in the aforementioned patent specification No. 3,302,202 or in the manner described and claimed in the specification of British Patent No. 1,046,558. When using an off-set course line or monitoring the transmission from a position off-set from the equi-signal course line, if a phase sensitive detector is used with a reference signal at half the difference frequency, preferably to keep the sensitivity of the indication constant, the phase of this reference signal of half the difference frequency should be maintained at the required value and this may conveniently be done using the arrangement described and claimed in the specification of co-pending United States application No. 533,211 filed Mar. 10, 1966 in which a further phase sensitive detector responsive to the output from said further balanced modulator provides a D.C. signal used for automatically controlling a phase shifter adjusting the phase of the 30 c./s. signal so as to maintain the output of this further phase sensitive detector at zero.

In such an arrangement, reversal of the direction of offset from the equi-signal course line, can readily be obtained by reversing the phase of the reference signal to said further balanced modulator; to maintain the automatic phase control in 30 c./s. loop, the phase of the 30 c./s. reference signal to said further phase sensitive detector has also to be reversed.

Figure 2:
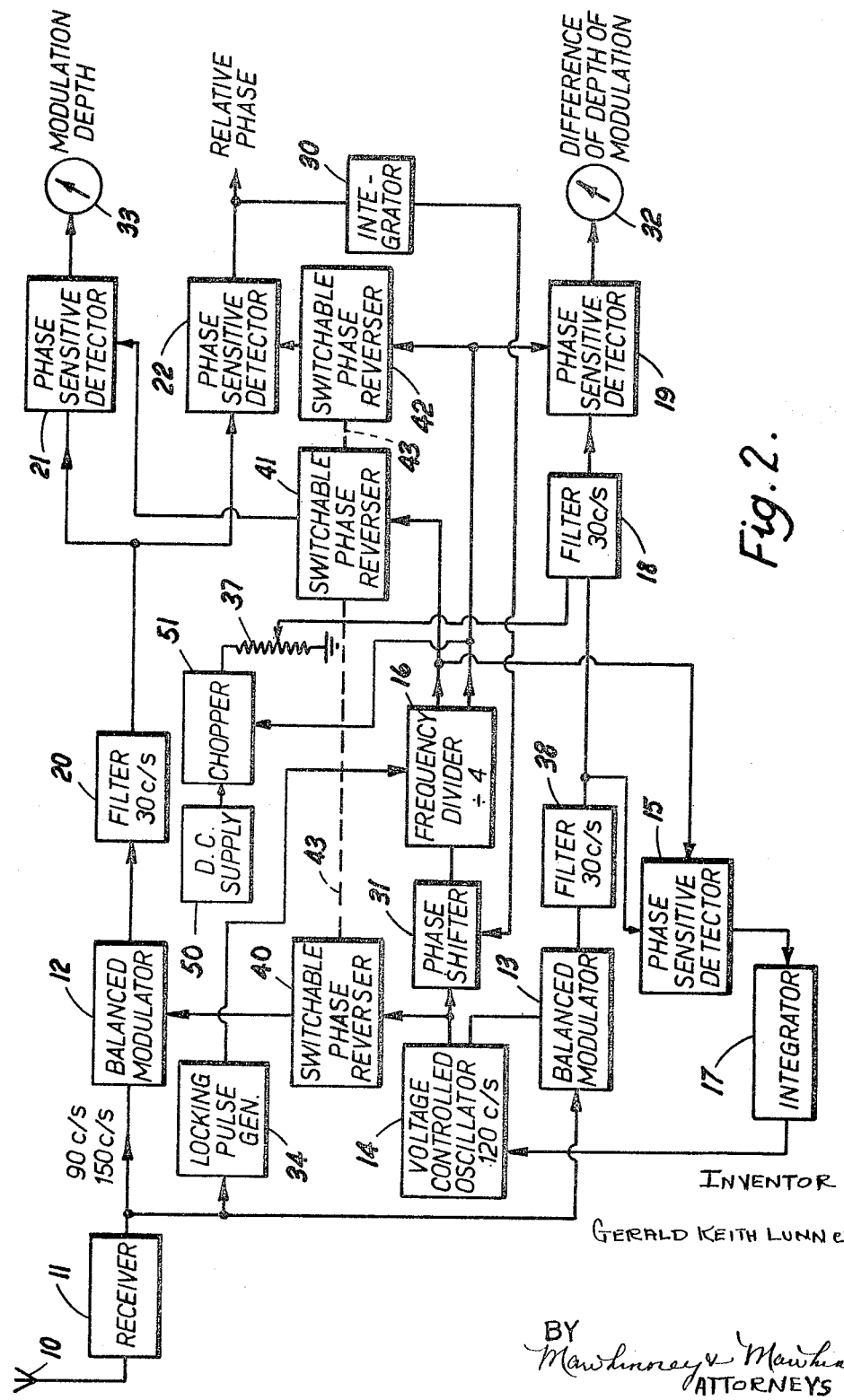

The following is a description of one embodiment of the invention, reference being made to the accompanying drawings in which FIGURE 1 is a diagram illustrating a receiver for an I.L.S. system suitable as an airborne calibration receiver or for a monitor station for ground transmitting equipment, and FIGURE 2 is a diagram illustrating a modification of the arrangement of FIGURE 1.

As previously explained, in an I.L.S. system, on a single carrier frequency there are radiated modulations of frequencies 90 c./s. and 150 c./s. It is the conventional practice in I.L.S. equipment to derive the two modulation frequencies from a common source so that the mean frequency is always twice the difference frequency irrespective of any slight variation in the exact frequencies. Moreover the two radiated signals are kept in a predetermined phase relation such that the instantaneous amplitudes of the two modulation signals both pass through zero going in the same direction at the same time. In the receiver shown in the accompanying drawing, use is made of these features of the I.L.S. transmissions. Because the two frequencies are derived from the same source, it becomes possible to obtain a reference signal of half the difference frequency by frequency division of a signal of the mean frequency. Furthermore because the relative phase of the two signals is maintained constant, a system such as is described in the aforementioned patent specification No. 3,302,202 for measuring the relative phase of these signals can be used to determine any phase error in the 30 c./s. reference signal in the receiver and automatically to correct for this error as is described and claimed in the specification of co-pending application No. 533,211.

Referring to FIGURE 1 the transmitted signals are picked up by an aerial 10 and fed to a receiver 11 including a detector to provide output signals including the 90 c./s. and 150 c./s. modulation tones which are fed to two balanced modulators 12 and 13. Each balanced modulator, as previously explained, is a device which acts as a multiplier of two electrical signals, that is to say a device giving an output the instantaneous amplitude of which is equal to the product of the instantaneous amplitudes of the inputs. The signals received from the receiver 11 are multiplied in the balanced modulators 12 and 13 respectively by 120 c./s. signals in phase quadrature from a reference signal generator 14 which is controlled in frequency and phase in a manner to be described later. The reference signal generator 14 is a voltage controlled oscillator providing two outputs in phase quadrature which are fed respectively to the two balanced modulators 12 and 13. Conveniently to provide these phase quadrature outputs, the oscillator 14 generates signals at 240 c./s. which are divided in frequency by two separate divide-by-two frequency dividers locked to opposite polarity half cycles of the 240 c./s. signals, thereby enabling two signals of 120 c./s. to be obtained exactly in phase quadrature. From the balanced modulator 13 the signal is fed via a low pass filter 38, passing a 30 c./s. signal but rejecting higher frequencies, to a phase sensitive detector 15 having a reference input of 30 c./s. derived from a frequency divider 16 which divides down the frequency of one of the 120 c./s. outputs from the oscillator 14 by a factor of four. It will be noted that the frequency divider 16 is fed from that output of the oscillator 14 which is supplied to the balanced modulator 12, this being in quadrature with the output applied to the balanced modulator 13. The output from the phase sensitive detector 15 includes direct voltage components which are used as control signals for controlling the frequency of the oscillator 14 and for this purpose the output from the detector 15 is fed through an integrator 17 which integrates the direct voltage components representing the phase error present at the output of the phase sensitive detector 15. The integrated error signal is applied to the oscillator 14 as a frequency control. By using a voltage representative of the phase error and applying it as a frequency control, in effect the phase error is integrated before being corrected. If any phase error is detected by the sensitive detector 15, this will produce a direct voltage of magnitude and polarity such as to cause an alteration of the frequency of the oscillator 14 in a direction tending to correct the phase error and the correction will continue until all the accumulated phase error has been removed. The phase and frequency of the oscillator output is thus maintained in the required condition. The integrator 17 is a high gain amplifier having capacitive feedback so giving a very high gain for the direct voltage components and forming, in effect, a low-pass filter passing the direct voltage components. Such an amplifier can readily be constructed however with a low drift input stage so avoiding problems due to drift at the input of the voltage controlled oscillator.

The output from the filter 38 is also fed, through a low pass filter 18 which passes the 30 c./s. component but which rejects higher frequencies, to a phase sensitive detector 19 having a 30 c./s. reference signal obtained from the frequency divider 16. The filter 18 may alternatively be a bandpass filter passing the required 30 c./s. component.

In the embodiment illustrated, the oscillator 14 is a multi-vibrator providing a square wave output and the frequency divider 16 comprises two binary divider stages. Use of a square wave oscillator and binary divider stages enables the phase of the 30 c./s. reference signal fed to the phase sensitive detector 15 with respect to the phase of the 120 c./s. reference signal readily to be preserved to the required degree of accuracy. The frequency divider 16 provides two outputs which are in phase quadrature and the signal fed to the phase sensitive detector 19 is in quadrature with that applied to the phase sensitive detector 15 so that the output from the phase sensitive detector 19 is a direct voltage representative of the difference of amplitudes of the 90 and 150 c./s. signals, the output from the phase sensitive detector 19, assuming there is no further input, being zero when the 90 and 150 c./s. signals are of equal amplitude. The output from this phase sensitive detector may be applied to an indicating meter 32 or a recorder for monitoring purposes or, in the case of a ground monitor station, may be used as a control voltage for controlling the relative amplitudes of the two signals radiated by the transmitter. For an airborne calibration receiver, the indicator 32 would conveniently be the conventional I.L.S. course line indicator.

The output from the balanced modulator 12 is passed through a low pass filter 20 passing a 30 c./s. component but rejecting higher frequencies and is then applied to two phase sensitive detectors 21 and 22. These are fed with 30 c./s. reference signals in phase quadrature respectively from the frequency divider 16. The output of the phase sensitive detector 21 is proportional to the mean of the depths of modulation of the two received signals. Since the transmitting system will be controlled so that these two depths of modulation are equal, the output from the phase sensitive detector 21 is thus a measure of the depth of modulation of the received signals and, in the case of a ground monitor, may be used for the control of the transmitter and/or indicated on an indicator 33 or recorder. The output from the phase sensitive detector 22 represents the relative phase of the 90 and 150 c./s. signals. These are maintained in a standard phase relationship at the transmitter as previously described and thus this output should be zero. If it is not, it is representative of a phase error in the 30 c./s. reference phase fed to the phase sensitive detector 22. This output is therefore used in the manner described and claimed in the specification of co-pending application No. 533,211 to control the phase of the 30 c./s. reference signal. For this purpose the output is fed to an integrator 30 integrating the D.C. components representative of the phase error and is then applied to a phase shifter 31 in the input to the frequency divider 16. This circuit forms a closed loop control for the 30 c./s. reference phase so that this reference signal is automatically maintained in the required phase.

To ensure that the outputs of the frequency divider 16 are locked to the appropriate cycles of the 120 c./s. signal from the oscillator 14, a locking pulse generator 34 is provided which produces, from the output of the receiver 11, a synchronising pulse for locking divider 16. Reference may be made to the specification of British Patent No. 1,046,559 for a description of a particularly suitable form of circuit for this purpose which will produce pulses at any required point in a cycle of the 30 c./s. signal. If the 120 c./s. oscillator 14 generates signals 240 c./s. which are divided in frequency by a factor of two as explained above, then the pulse output from the locking pulse generator 34 is also used to lock the frequency divider used for this purpose and thereby to select the required phase quadrature relationship out of the two alternative phase quadrature relationships which are possible using such a divider.

In the receiver shown in FIGURE 1 it is required to provide a zero indication on the indicator 32 when the receiver is off-set from the equisignal course line defined by the received signals. For this purpose a further signal is fed into the 30 c./s. filter 18. In the particular embodiment illustrated this further signal is an adjustable fraction of the modulation depth signal from the output of the 30 c./s. filter 20. As previously explained the output from this 30 c./s. filter comprises phase quadrature components at 30 c./s. one of which represents the sum of the input signals and hence, since these input signals are equal, the modulation depth and the other of which is kept at zero by maintaining the proper phase relationship between the modulation signals to the transmitter. This 30 c./s. signal however is in phase quadrature with that fed to 30 c./s. filter 18 and it is therefore fed through a 90° phase shifter 36 and applied to a potential divider 37 which is illustrated as a resistive potentiometer. This potential divider enables a known fraction of the modulation signals to be tapped off and this is fed into the input to the filter 18. This filter acts as a summing amplifier and also ensures that only the required 30 c./s. component is passed to the phase sensitive detector 19.

The phase shifter 36, which may be arranged either before the potential divider 17 as shown in FIGURE 1 or after the potential divider, effects a shift of 90° in such sense that the signal fed into the detector 19 from the potential divider 37 is in opposition to the signal from the balanced modulator 13. Thus, when the indicator 32 would normally have a deflection indicating that the receiver is off the equisignal course line, the input from the potential divider 37 brings the indicator back to zero. It is therefore possible to use this indicator in the conventional way to fly along an off-set radial course line. The setting of the potential divider 37 determines the position of this off-set course line and it will be noted that, by using the output of the 30 c./s. filter 20 as the input to this potential divider 37, the off-set course line is defined as a line where the difference of depths of modulation bears a known ratio to the sum of the depths of modulation. Generally the depths of modulation of the two signals for the transmitter are maintained equal and this off-set course line is determined in a manner which is independent of the actual modulation depth at the receiver. Moreover it would be independent of changes in the receiver 11, for example changes in the working point of an automatic gain control circuit.

The direction of deviation of the off-set course line from the equisignal line can be reversed by reversing the phase of the 120 c./s. reference signal fed to the balanced modulator 12. If the 120 c./s. reference phase is reversed, to maintain the phase control using the 30 c./s. phase loop, the phase of the 30 c./s. reference to the phase sensitive detectors 21 and 22 has to be reversed. In FIGURE 1, there are illustrated diagrammatically switchable phase reversers 40, 41 and 42 respectively for the 120 c./s. reference signal to the balanced modulator 12 and the 30 c./s. reference signals to the phase sensitive detectors 21 and 22, their phase reversers being ganged as indicated by the dashed lines 43. In practice, the reference signals may be available in the two required phase conditions and the switching can then be effected by selecting the required signals.

It will be appreciated that if it is desired to define the off-set course line as a line where the difference of depths of modulation is some predetermined value, as has been the conventional practice heretofore in using I.L.S. calibration receivers of the type having filters for separating the two signals of different frequency, then instead of using the output from the 30 c./s. filter 20 as a 30 c./s. signal input to the potential divider 37 a signal input to this potential divider can be obtained from a D.C. source chopped at 30 c./s. using the appropriate output from the frequency divider 16 as the modulating signal. By selecting the appropriate output, there is then no necessity to have the quadrature phase shifter 36. Such an arrangement is illustrated in FIGURE 2. In this figure, the same reference characters are used as in FIGURE 1 to indicate corresponding features and mention will be made only of the distinctive features of FIGURE 2. In that figure, a direct voltage supply source 50 feeds a chopper 51 which is controlled by the same 30 c./s. reference signal as is used for the reference input to the phase sensitive detector 19. The output from the chopper 51 is fed via the potential divider 37 to the input to the filter 18. Thus, provided the filter 18 has zero phase shift, a further adjustable magnitude signal is fed into the phase sensitive detector 19 in phase with the reference signal for that detector.

We claim:

1. Apparatus for comparing the amplitudes of two input signals of different frequencies comprising a signal source providing a reference signal of a frequency exactly midway between that of the two input signals, means for adjusting the phase of the reference signal, a balanced modulator for amplitude-modulating the phase-adjusted mean frequency signal with the combined input signals, a phase sensitive detector for detecting the amplitude of the output signal from the balanced modulator at a frequency equal to half the difference between the frequencies of the two input signals, means for feeding to said phase sensitive detector a reference signal of said frequency equal to half the difference between the frequency of the two input signals and in phase with the component of the detector input representative of the difference of amplitude of said input signals, a signal source providing a further signal of a frequency equal to half the difference between the frequencies of the two input signals into said detector, said further signal being in phase with the component of the detector input representative of the difference of amplitude of the two input signals, means for adjusting the amplitude of said further signal, and means for feeding the adjusted amplitude signal to said phase sensitive detector.

2. Apparatus as claimed in claim 1, wherein the feed from the balanced modulator to the detector includes a band-pass filter tuned to a frequency equal to half the difference of the frequencies of the two input signals.

3. Apparatus as claimed in claim 2, wherein said means for feeding said further signal into said detector comprises means for feeding said further signal into the input of said band-pass filter.

4. Apparatus as claimed in claim 1, wherein said signal source providing said further signal into said detector includes a direct voltage source modulated at the required frequency.

5. Apparatus as claimed in claim 4, wherein the modulation of the direct voltage source is effected by a chopper at the frequency of the reference signal for the phase sensitive detector.

6. In an I.L.S. system, apparatus for determining wherein input signals of frequencies 90 c./s. and 150 c./s., received as modulations on carriers of the same frequency, have a predetermined difference of amplitude comprising means responsive to the received signals providing a mean frequency reference signal of a frequency exactly midway between that of the two input signals, means for adjusting the phase of the mean frequency reference signal, a balanced modulator for amplitude-modulating the phase-adjusted mean frequency signal with the combined input signals, a detector for detecting the amplitude of the output signal from the balanced modulator at a frequency equal to half the difference between the frequencies of the two input signals, a direct voltage source, a frequency divider dividing said mean frequency reference signal by a factor of four, a modulator modulating said direct voltage suorce with the output of said divider which is in phase with the component of the detector input representative of the difference of amplitude of the two input signals, means for adjusting the amplitude of a signal for said modulator to provide an off-setting signal of adjustable amplitude and of a frequency equal to half the difference between the frequencies of the two input signals and means for feeding said off-setting signal into said detector.

7. In an I.L.S. system, apparatus for determining when two input signals of different frequencies, received as modulations on carriers of the same frequency, have a predetermined amplitude ratio, which apparatus comprises means for receiving said signals to provide a combined input of said different frequencies, means for deriving from said combined input a mean frequency reference signal of a frequency exactly midway between that of the two input signals, means for adjusting the phase of the mean frequency reference signal, a balanced modulator for amplitude modulating the phase-adjusted mean frequency signal with the combined input signals, a phase sensitive detector for detecting the amplitude of the output signal from the balanced modulator at a frequency equal to half the difference between the frequencies of said two input signals, means for feeding to said phase sensitive detector a reference signal of said frequency equal to half the difference between the frequencies of the two input signals and in phase with the component of the detector input representative of the difference of amplitude of said input signals, means for producing from said input signals a further signal having an amplitude related to the modulation depth of the received signals and of a frequency equal to half the difference between the frequencies of the two input signals and in phase with the component of the detector input representative of the difference of amplitude of the two input signals, means for adjusting the amplitude of said further signal, and means for feeding said further signal after the amplitude adjustment into said detector.

8. Apparatus as claimed in claim 7, wherein said means for producing said further signal comprises a further balanced modulator modulating the combined input signals with a reference signal of the mean frequency of that of the two input signals but in phase quadrature with the reference signal fed to the first mentioned balanced modulator, a filter for selecting the component at half the difference frequency from the output of the further balanced modulator, and wherein said means for adjusting the amplitude of said further signal comprises an adjustable attenuator for providing a known fraction of the output of the further balanced modulator and a phase shifter introducing a phase shift of 90° in said further signal.

9. Apparatus as claimed in claim 8, wherein said adjustable attenuator comprises a voltage divider.

10. Apparatus as claimed in claim 8, wherein means are provided for reversing the phase of the reference signal fed to said further balanced modulator.

11. Apparatus as claimed in claim 10 and wherein there is provided a further phase sensitive detector responsive to the output of said further balanced modulator and using a reference signal of a frequency equal to half the difference of the frequencies of the input signals and in a phase such as to detect the component of the output of the further balanced modulator representative of the phase error of the reference signal of half the difference frequency to provide a phase control for that reference signal and wherein means are provided for reversing the phase of the reference signal fed to said further phase sensitive detector.

References Cited

UNITED STATES PATENTS

| | | | |
|---|---|---|---|
| 2,489,248 | 11/1949 | Abraham | 343—107 X |
| 3,302,202 | 1/1967 | Gouriet | 343—109 |
| 3,308,466 | 3/1967 | Benjamin | 343—109 X |

RODNEY D. BENNETT, *Primary Examiner.*

CHESTER L. JUSTUS, *Examiner.*

H. C. WAMSLEY, *Assistant Examiner.*